Jan. 27, 1942.   C. SAURER   2,271,349
RADIATOR HOSE AND DRAIN
Filed Feb. 23, 1938

INVENTOR
CURT SAURER
BY
ATTORNEYS

Patented Jan. 27, 1942

2,271,349

UNITED STATES PATENT OFFICE 2,271,349

RADIATOR HOSE AND DRAIN

Curt Saurer, Akron, Ohio, assignor to The Firestone Tire & Rubber Company, Akron, Ohio, a corporation of Ohio Application February 23, 1938, Serial No. 191,975

5 Claims. (Cl. 251—155)

This invention relates to radiator hoses and drains of the types found in motor vehicles, and more especially it relates to a radiator hose construction that comprises a drain.

The chief objects of the invention are to provide a radiator hose and drain combined in a single structure; to obviate the use of metallic drain cocks as heretofore constituted; to provide a construction wherein the valve seat of the drain cock is incorporated in the radiator hose; and to simplify the construction and reduce the cost of structures of the character mentioned. Other objects will be manifest as the specification proceeds.

Figure 1:
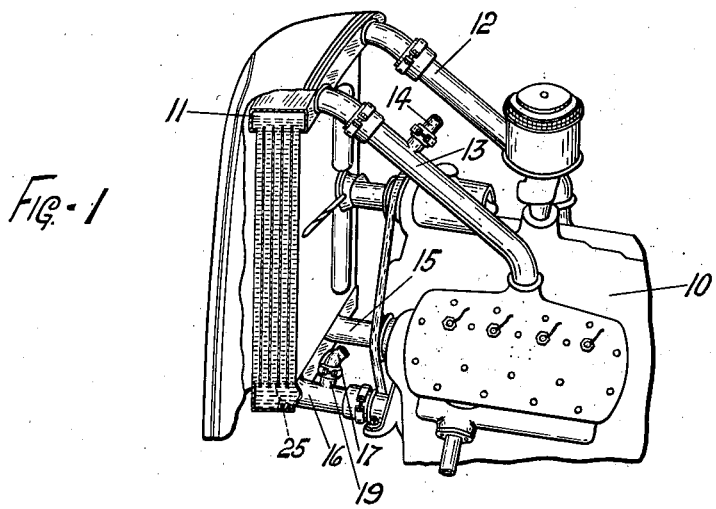
Figure 1 is a perspective view of vehicle motor, radiator and associated elements including the improved radiator hose and drain, a part being broken away and in section.
Figure 2:
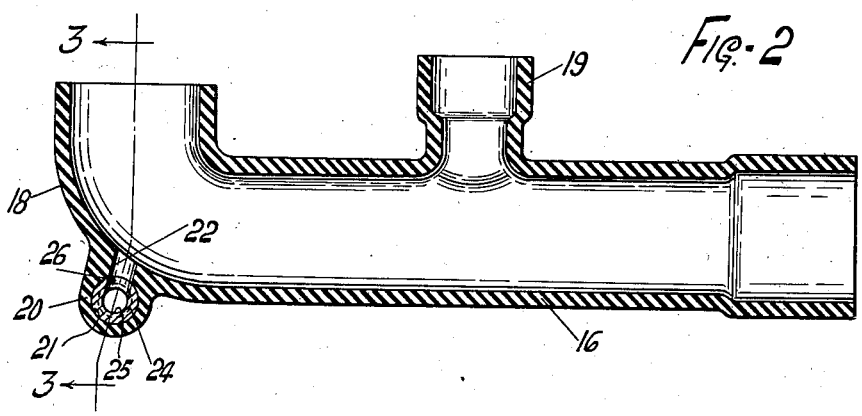
Figure 2 is a longitudinal section through the improved radiator hose and drain structure.
Figure 3:
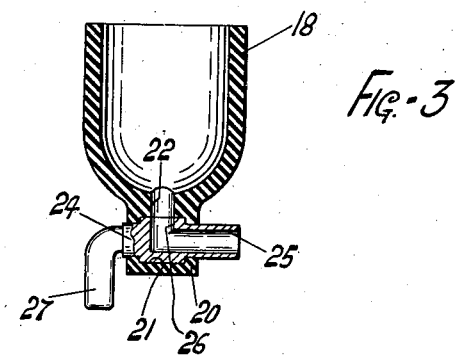
Figure 3 is a section on the line 3—3 of Figure 2.

Referring now to Figure 1 of the drawing, there is shown a vehicle motor 10 of the V-type, a radiator 11, radiator hoses 12, 13 extending from the top of the motor to the top of the radiator, the hose 13 having connection with a hose 14 extending to a vehicle heater (not shown) of the hot water type, and radiator hoses 15, 16 extending from the bottom of the motor to the bottom of the radiator 11, hoses 15, 16 being identical except that the latter is provided with a connection to a hose 17 from the said vehicle heater. Both hoses 15 and 16 are constructed according to the invention, the latter being shown in detail, on a larger scale, in Figures 2 and 3.

As is clearly shown in the latter figures, the structure 16 is tubular in form and composed of molded vulcanized rubber composition that may be somewhat stiff but not hard. It has a right angle elbow 18 formed at one end, and in an intermediate region has a short integral, laterally extending inlet structure 19 for connection with the hose 17. Formed on the convex side of the elbow 18, which is substantially at the lowest point of the water cooling system, is an integral, downwardly extending formation 20 constituting the valve body of a pet cock, the same being formed with a transverse bore or passage 21, and a passage 22 extending thereinto from the interior of the tubular hose structure. The passage 21 is circular in transverse section, and is of larger diameter in its medial region, where the passage 22 enters, than at the ends thereof. The passage 21 constitutes a journal or socket for a rotatable metal valve core 24 of cylindrical form having an enlarged medial portion and reduced end portions. The valve core 24 is formed with an axial bore 25 extending from one end thereof to its medial region where it joins the inner end of a radial bore 26. The other end of the valve core is provided with an integral angular lever 27 by means of which the core 24 is manually rotated. The arrangement is such that when the valve core is in the angular position shown in Figures 2 and 3, valve passage 26 is aligned with passage 22 from the interior of the hose 16 and fluid will drain through said passages from the radiator system. Rotation of the valve core through an angle of no more than 90°, in either direction, will close off the valve passage 26 from hose passage 22 and the fluid will cease to flow.

The valve socket 21 is of such size as closely to embrace the valve core and thereby to prevent leakage, yet to enable the valve core readily to be rotated. The rubber of the hose is sufficiently elastic to enable the formation 20 to be deformed sufficiently to permit insertion of the valve core in its socket.

The invention is extremely simple in construction and efficient in operation, and achieves the other objects set out in the foregoing statement of objects.

What is claimed is:

1. A pet cock comprising a valve body molded of resilient rubber, said body having a cylindrical opening therethrough, the central portion of which is enlarged to a greater diameter than its end portions, a rotatable cylindrical valve core having an enlarged central portion with reduced end portions, said core being disposed in said opening so that the enlarged central portion of the core is resiliently gripped by the wall of the enlarged central portion of said body opening, said core and body having port openings therein which in one position of said core become aligned to form a passageway through said body and core and which in other positions of said core are non-aligned to thereby close said valve.

2. A pet cock comprising a valve body molded of relatively soft rubber, said body having a cylindrical opening therethrough, the central portion of which is enlarged to a greater diameter than its end portions, a rotatable cylindrical metallic valve core having an enlarged central portion with reduced end portions, said core being disposed in said opening so that the enlarged central portion of said core is resiliently gripped by the walls of the enlarged central portion of said body opening, and with the reduced end portions of said core resiliently gripped by the adjacent portions of said body opening to thereby prevent axial movement of said core, said core and body having port openings therein which in one position of said core become aligned to form a passageway through said core and body and which in other positions of said core are non-aligned to thereby close said valve.

3. A pet cock, as claimed in claim 2, wherein said core port consists of an axial bore therein which extends from one end thereof to the central portion of the core and which intersects an opening which extends from the inner end of said bore to the outer surface of the enlarged central portion of the core.

4. A pet cock comprising a valve body molded of resilient rubber, said body having a cylindrical opening therethrough, the central portion of which is enlarged to a greater diameter than its end portions, a rotatable cylindrical valve core having an operating handle on one end thereof with a reduced portion between said handle and said core portion and with a reduced end portion opposite said handle, there being an axial bore in the end of said core opposite said handle which extends therein to said central portion, and said core having a port extending from the inner end of said axial bore to the outer surface of said enlarged portion, said core being disposed in said opening so that its enlarged central portion is resiliently gripped by the walls of the enlarged central portion of said body opening and the reduced end portions of said core are resiliently gripped by the adjacent portions of the body to thereby prevent axial movement of said core, said body having a port opening therein which in one position of said core becomes aligned with the port opening in the core to form a passageway through said body and core and which in other positions of said core are non-aligned to thereby close said valve.

5. A pet cock comprising a valve body molded of relatively soft rubber, said body having a cylindrical opening therethrough, a rotatable cylindrical metallic valve core disposed within said cylindrical opening, said core being slightly larger than said opening so that it is resiliently gripped by the walls of said body, and said core having a pair of annular shoulders formed thereon which are radially offset from the cylindrical portion of the core, said body portion being formed with annular portions which coact with said shoulders to prevent axial movement of said core in both directions, said core and body having port openings therein, which in one rotatable position of said core become aligned to form a passageway through said core and body and which in other positions of the said core are not aligned to thereby close said valve.

CURT SAURER.